United States Patent [19]
Yamaguchi et al.

[11] 3,977,368
[45] Aug. 31, 1976

[54] ROTARY PISTON ENGINE

[75] Inventors: Shunzo Yamaguchi, Nishio;
Toshihiko Igashira, Toyokawa;
Masami Hujita, Okazaki, all of
Japan

[73] Assignee: Nippon Soken, Inc., Nishio, Japan

[22] Filed: May 15, 1974

[21] Appl. No.: 470,294

[30] Foreign Application Priority Data
May 18, 1973 Japan.................... 48-56138
Sept. 6, 1973 Japan.................... 48-104562
Sept. 18, 1973 Japan.................... 48-105648
Feb. 14, 1974 Japan.................... 49-18178

[52] U.S. Cl............................. 123/8.13; 60/901;
123/8.05
[51] Int. Cl.²........................................ F02B 53/10
[58] Field of Search............ 60/901; 123/8.05, 8.13,
123/8.45, 26

[56] References Cited
UNITED STATES PATENTS

| | | | |
|---|---|---|---|
| 3,136,302 | 6/1964 | Nallinger et al.............. | 123/8.09 |
| 3,483,849 | 12/1969 | Yamamoto..................... | 60/901 X |
| 3,722,493 | 3/1973 | Hartmann et al................ | 60/901 X |
| 3,732,696 | 5/1973 | Masaki........................... | 60/286 X |
| 3,780,707 | 12/1973 | Cole............................. | 123/8.13 |
| 3,791,145 | 2/1974 | Yamamoto..................... | 60/901 X |
| 3,817,220 | 6/1974 | Brumm et al................... | 60/901 X |

FOREIGN PATENTS OR APPLICATIONS
1,451,733 7/1969 Germany............................ 123/8.05

*Primary Examiner*—Carlton R. Croyle
*Assistant Examiner*—Michael Koczo, Jr.
*Attorney, Agent, or Firm*—Cushman, Darby & Cushman

[57] ABSTRACT

A rotary piston engine comprises a housing having a trochoidal peripheral wall and side walls on both sides thereof, a rotor adapted to perform a planetary rotary motion along the inner surface of the peripheral wall and intake and exhaust ports formed in the housing. The engine performs intake, compression, combustion and exhaust of a working fluid by means of the planetary rotary motion of the rotor. An air injection port is formed in the peripheral wall of the housing between the exhaust port and a portion of the peripheral wall through which the minor axis of the trochoidal curve extends. A means is provided to supply air through the air injection port into the housing to prevent recirculation of exhaust gas into the intake chamber of the engine, stratify an air-fuel mixture of a richness appropriate for spark ignition and a lean air-fuel mixture with a resultant combustion of the stratified mixtures and reduce harmful exhaust gases, particularly, hydrocarbon (HC) and carbon monoxide (CO) by means of the engine operation with a relatively lean air-fuel mixture.

7 Claims, 18 Drawing Figures

ROTARY PISTON ENGINE

BACKGROUND OF THE INVENTION

1. FIELD OF THE INVENTION

The present invention relates to a rotary piston engine having a housing and a rotor rotatable within the housing to perform four strokes, namely, intake, compression, combustion and exhaust of a working fluid. More particularly, the invention is concerned with a reduction of harmful components of the gases exhausted from the rotary piston engine.

2. DESCRIPTION OF PRIOR ART

Because of the structure of the heretofore known rotary piston engine, violent currents were caused within the working fluid in the compression chamber of the engine to make difficult the ignition of the fluid. In addition, a large amount of exhaust gas was recirculated from the exhaust chamber into the intake chamber. In order to obtain a smooth operation of the engine, it has been required to supply the engine with a rich working fluid, i.e., air-fuel mixture of an air-fuel ratio of, in general, approximately 13 with a resultant disadvantage that the engine has exhausted large amounts of harmful gas such as carbon monoxide ($CO$) and hydrocarbon ($HC$).

SUMMARY OF THE INVENTION

It is an object of the present invention to prevent recirculation of the exhaust gas into an intake chamber of the rotary piston engine, stratify an air-fuel mixture of a richness appropriate for spark ignition and a lean air-fuel mixture with a resultant combustion of the stratified mixtures and reduce the harmful exhaust gases, particularly, hydrocarbon ($HC$) and carbon monoxide ($CO$) by means of proper engine operation of a relatively lean air-fuel mixture.

The object is achieved by providing an air injection port in the rotor housing of the engine at a location between the exhaust port and the portion of the peripheral wall of the housing through which the minor axis of the trochoidal curve of the peripheral wall extends. The air injection port is so positioned in the housing as to be in communication with an intake chamber of the engine when the intake chamber is in its initial state. A means is provided for supplying air through the air injection port into the engine.

It is a second object of the present invention to control the air supply through the air injection port in accordance with different conditions of the engine operation for thereby preventing recirculation of exhaust gas into an intake chamber and maintaining the air-fuel mixture at a proper air-fuel ratio over all of the ranges of the operating conditions of the engine.

In order to achieve the second object, a valve may be provided in a passage extending between the air injection port and the air supply means and may be controlled so that no air is supplied during the operation of the engine at a high speed and under loaded condition. In an alternative embodiment of the invention, a flow regulating valve may be provided and controlled in accordance with the vacuum in an intake manifold of the engine so that the amount of air supply is increased as the load on the engine is increased. One of these alternative embodiments may be selected based on the consideration of the capacity of the air supply means and the requirement for one of the maintenance of the output power during loaded operating condition and the reduction of the harmful exhaust gases throughout all the operating ranges of the engine, as will be discussed in more detail later.

It is a third object of the present invention to prevent recirculation of the exhaust gas into an intake chamber of the engine and cause the engine to perform stratified combustion by causing a lean mixture to be held at about the leading or forward end portion of a combustion chamber while causing a rich mixture at about the trailing or rearward end portion of the combustion chamber.

The third object of the invention can be achieved by positioning the intake and exhaust ports so that they are not in communication with any working chamber when the latter is transformed from an exhaust chamber into an intake chamber and by causing the air injection port to be communicated with each working chamber only when the latter is transformed from an exhaust chamber into an intake chamber. An air suction port may preferably be formed in the rotor housing and so positioned as to be communicated with an intake chamber during initial state thereof. A throttle valve, which is operatively connected with the throttle valve of a carburetter, may also be provided in a passage extending between the air suction port and the atmosphere. A check valve may advantageously be provided in the passage and so controlled that air is allowed to flow into an intake chamber during its initial state.

It is a fourth object of the present invention to prevent recirculation of exhaust gases into an intake chamber, enable the engine to perform stratified combustion by causing a rich mixture to be held at about the leading or forward end portion of a combustion chamber while causing a lean mixture to be retained at about the trailing or rearward end portion of the combustion chamber and supply fuel to the engine only when the air injection port is in communication with an intake chamber.

The fourth object can be achieved by providing the engine with a fuel supply means disposed in a passage extending between the air injection port and the air supplying means. The fuel supply means may preferably include a venturi formed in the passage between the air injection port and the air supply means. Advantageously, means may be provided for controlling the supply of fuel so that the fuel is supplied by the fuel supply means only when the air injection port is communicated with an intake chamber.

The embodiments of the invention which are designed to achieve the third object of the invention may advantageously be applied to a case where an improvement in the engine output is desired. On the contrary, the embodiments of the invention which are designed to achieve the fourth object of the invention may advantageously be applied to a case where it is especially desired to reduce the HC content in the exhaust gases.

The above and other objects, features and advantages of the present invention will be described by way of example with reference to the accompanying drawings.

BRIEF DESCRIPTION OF DRAWINGS

It is to be noted that similar reference numerals represent similar parts of respective embodiments throughout the drawings.

DESCRIPTION OF PREFERRED EMBODIMENTS

Figure 1:
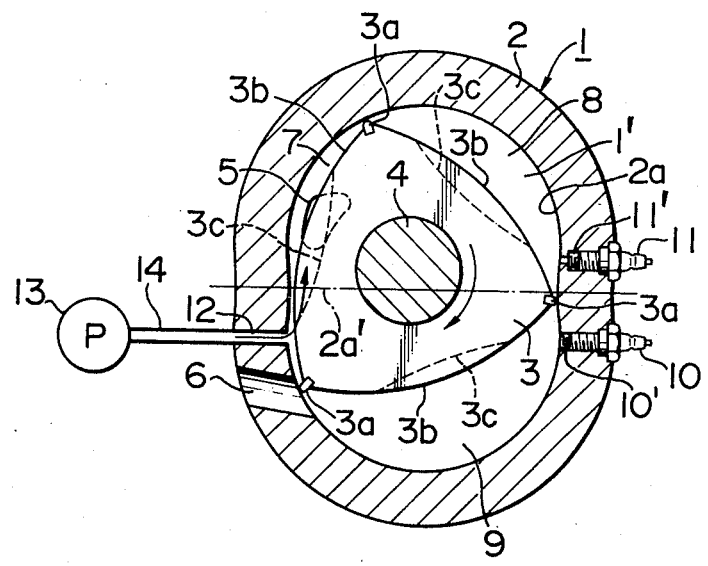
FIGS. 1 to 3 are diagrammatic sectional views of a first embodiment of the rotary piston engine according to the present invention showing the rotor in its different operating positions.
Figure 2:
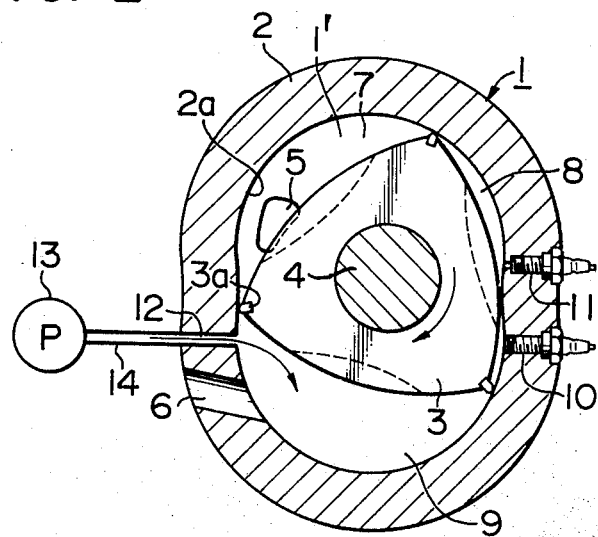
Figure 3:
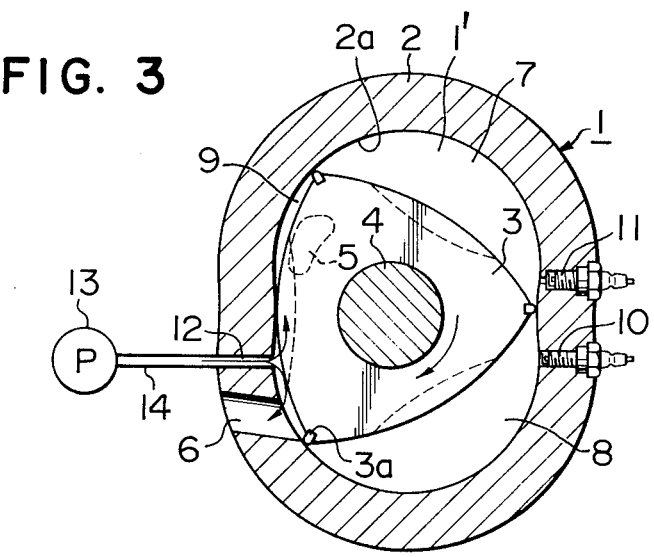

Referring first to FIGS. 1 to 3, the rotary piston engine according to the invention includes a housing 1 having a rotor housing part 2 and side housing parts 1' (only one of which is shown) disposed on both sides of the rotor housing part. The former has an inner surface or peripheral wall 2a formed of trochoidal curves having two arches having a minor axis 2a'. The side housing parts 1' have flat walls which form the side walls of the housing 1. A generally triangular rotary piston or rotor 3 is disposed within the housing 1 and has apex seals 3a mounted on the rotor at its three apexes. The rotor is so mounted as to perform a planetary rotary motion in a direction indicated by an arcuated arrow so that the apex seal 3a are always in sliding contact at their outer edges with the peripheral wall 2a of the housing 1. The rotor also has side seals (not shown) which are also in sliding contact with the side walls 1'. The rotor has a shaft 4 which is rigidly secured to the center thereof and which is eccentric with respect to the center of the housing 1. The shaft 4 serves to transmit the planetary rotary motion of the rotor 3 to the outside of the engine through a transmission (not shown).

An intake port 5 is formed in the side housing part 1' to introduce a working fluid, such as a mixture of a fuel, such as gasoline, and air, the mixture being produced by a carburetter (not shown). An exhaust port 6 is formed in the rotor housing part 2 to exhaust the gaseous combustion products produces by the combustion of the mixture. The intake port 5 is positioned on the forward side of the trochoidal minor axis 2a' with respect to the rotation of the rotor 3 while the exhaust port 6 is positioned on the rearward side of the axis 2a' as viewed on the rotor rotation. It will be apparent to those skilled in the art that the intake port 5 may alternatively be formed in the rotor housing part 2 and the exhaust port 6 may alternatively be formed in the side housing part 1'.

The peripheral wall 2a cooperates with sides 3b of the rotor 3 to define three variable volume working chambers 7, 8 and 9 which are moved along the peripheral wall 2a as the rotor is rotated and each of which is sequentially transformed into intake, compression, combustion and exhaust chambers correspondingly to the respective strokes of the rotor 3. As an example, in the position of the engine shown in FIG. 2, the working chamber 7 is an intake chamber, the working chamber 8 is a compression chamber and the working chamber 9 is an exhaust chamber. The sides 3b of the rotor 3 are formed therein with recesses 3c, respectively, which form parts of the working chambers 7, 8 and 9, respectively.

Ignition plugs 10 and 11, which are connected to distributors (not shown), ignition coils (not shown) etc., are screwed into holes 10' and 11', respectively, which are formed in the rotor housing part 2 substantially diametrically opposite side with respect to the intake port 5 and the exhaust port 6. The holes 10' and 11' are positioned on the opposite sides of the trochoidal minor axis 2a', as shown in FIG. 1.

An air injection port 12 is formed in the rotor housing part 2 and opened in the peripheral wall 2a between the trochoidal minor axis 2a' and the opening of the exhaust port 6. In the case where the exhaust port 6 is formed in the side housing part 1', the air injection port 12 may be positioned between the trochoidal minor axis 2a' and a portion of the peripheral wall 2a adjacent to the exhaust port 6.

A means 13 is provided to supply air to the air injection port 12 through a passage provided by a pipe line 14. The air supply means 13 may be a vane type air pump of a kind which is generally used to supply air to exhaust gas cleaners. The air pump may be driven by either the output shaft of the engine or a separate electric motor. In the case the air pump is driven by the engine output shaft, the discharge of the air pump and thus the amount of the air supply to the air injection port 12 advantageously vary in proportion to the variation in the speed of the engine operation because the speed of the air pump is varied correspondingly to the variation in the engine speed, i.e., the rotation of the engine output shaft, the advantage being discussed in more detail later.

With the above arrangement, the rotor 3 performs the planetary-rotary motion. As the rotor is sequentially moved from the bottom dead center of the compression stroke to the top dead center thereof and from the bottom dead center of the exhaust stroke to the top dead center thereof, the working chambers are correspondingly moved while their volumes are varied. When a working chamber is rendered an intake chamber 7 and communicates with the intake port 5, the working fluid, i.e., the air-fuel mixture, is taken into the intake chamber. When the working chamber becomes a compression chamber, the mixture is compressed and ignited. When the working chamber is further moved and becomes combustion chamber 8, the mixture is burnt. When the working chamber is further moved and finally becomes an exhaust chamber 9, the combustion products produced by the combustion are exhausted through the exhaust port 6.

In the operation of the engine described above, fresh air is forcibly supplied through the pipe line 14 and the air injection port 12 into the housing 1 by the air pump 13. The supply of the fresh air is advantageous as will be discussed hereunder. When the rotor 3 is in the position shown in FIG. 1, the working chambers 7, 8 and 9 are intake, compression and exhaust chambers, respectively, the working chambers 7 and 9 being in the initial states of the intake and exhaust chambers, respectively. At this time, the air injection port 12 is opened to the intake chamber 7 so that fresh air is suppled thereto. The rotor 3 is moved toward the position shown in FIG. 2. Just before the rotor 3 reaches the position shown in FIG. 2, in other words, when one apex seal 3a adjacent to the intake chamber 7, which one apex seal is positioned at the rearward or trailing end of the intake chamber 7, has just passed past the opening of the air injection port 12, the air supply to the intake chamber 7 is discontinued and, thereafter, the air is fed into the succeeding exhaust chamber 9, as shown in FIG. 2.

As described, the supply of fresh air into the intake chamber 7 is continued for a predetermined short period of time just after the working chamber is transformed to the intake chamber 7. Thereafter, the chamber 7 is supplied, through the intake port 5, with an air-fuel mixture produced by a carburetor, not shown. Thus, the air supplied through the air injection port 12 is placed at the leading or forward end portion of the intake chamber 7, whereas the air-fuel mixture fed through the intake port 5 is placed at the trailing or rearward end portion of the intake chamber, so that the air and the mixture are stratified in the intake chamber. The mean air-fuel ratio throughout the intake chamber 7 can be as lean as about 18 for reasons to be made apparent later.

The fresh air fed into the exhaust chamber 9, as shown in FIG. 2, is advantageously operative to burn away the unburnt HC contained in the exhaust gas in the exhaust chamber. When the rotor 3 is further rotated to the position shown in FIG. 3, the intake chamber 7, the compression chamber 8 and the exhaust chamber 9 shown in FIG. 2 are now in the initial stage of a compression chamber, in the last stage of the combustion chamber and in the last stage of the exhaust chamber, respectively. Within the compression chamber 7 the air and mixture are so distributed that, as will be apparent from the description in conjunction with the chamber 7 which has been the intake chamber, a stratum of the air is located at the forward end portion of the compression chamber 7 and a stratum of the mixture is positioned in the rearward end portion of the chamber. This stratified distribution is generally maintained, although slightly disturbed, by the time the rotor 3 is further rotated to a position in which the compression chamber 7 has reached to its top dead center. The ignition by the ignition plugs 10 and 11 takes place as the plugs are disposed adjacent to the torochoidal minor axis 2a'. Thus, when the compression chamber is transformed to a combustion chamber, there takes place a combustion of a mixture which is lean as a whole.

It is known that the amount of CO contained in an engine exhaust gas varies with the variation in the richness (air-fuel ratio) of a mixture so that the amount of CO is reduced in proportion to the reduction in the richness of the mixture. This apparently means that the engine described reduces the amount of CO contained in the exhaust gas from the engine. It is also known that the amount of $NO_x$ varies with the variation in the richness of a mixture so that the amount of $NO_x$ is the larges at the theoretical air-fuel ratio (approximately 15) and is reduced as the mixture becomes richer or leaner than the theoretical air-fuel ratio. With the structure of the engine described above, the amount of air supplied to the intake chamber may be appropriately determined to reduce the amount of $NO_x$. The amount of air supplied to the intake chamber can be controlled by selection of the discharge of the air pump 13 and the location of the air injection port 12. In general, a carburetter for producing an air-fuel mixture is so designed that, when the engine operates at a high speed and under heavy load, the carburetter produces a richer mixture in view point of output of the engine. If the air pump 13 is driven by the output shaft of the rotor 3, the discharge of the air pump 13 is increased as the speed of the engine increases, with a resultant advantage that the increment of the discharge of the air pump compensates to a certain extent for the increment of the richness of the mixture.

The engine according to the present invention provides an additional advantage as will be discussed hereunder. When the engine is in the position shown in FIG. 3, the fresh air is fed into the exhaust chamber 9 and a substantially part of the air is exhausted through the exhaust port 6. When the rotor 3 has been slightly rotated from the position in FIG. 3 and one apex seal 3a has just passed past the exhaust port 6 so that the combustion and exhaust chambers 8 and 9 have just been transformed to exhaust and intake chambers, respectively, these exhaust and intake chambers are communicated with each other through the exhaust port 6. The prior art rotary piston engine has a disadvantage that a part of the exhaust gas recirculates from the exhaust chamber into the intake chamber at such a moment. With the rotary piston engine of the present invention described above, however, the flow of the fresh air as described completely prevents the recirculation of the exhaust gas into the intake chamber to assure that the intake chamber is always supplied with a fresh air and an air-fuel mixture. Thus, with the structure and arrangement described above, it is possible to reduce the amounts of all of CO, HC and $NO_x$ contained in the exhaust gas.

In the embodiment described, the air injection port 12 is opened in the peripheral wall 2a of the rotor housing. However, the air injection port may alternatively be opened in a side wall 1' of the housing 1 at a location adjacent to the peripheral wall 2a with a similar advantageous function.

SECOND EMBODIMENT

Figure 4:
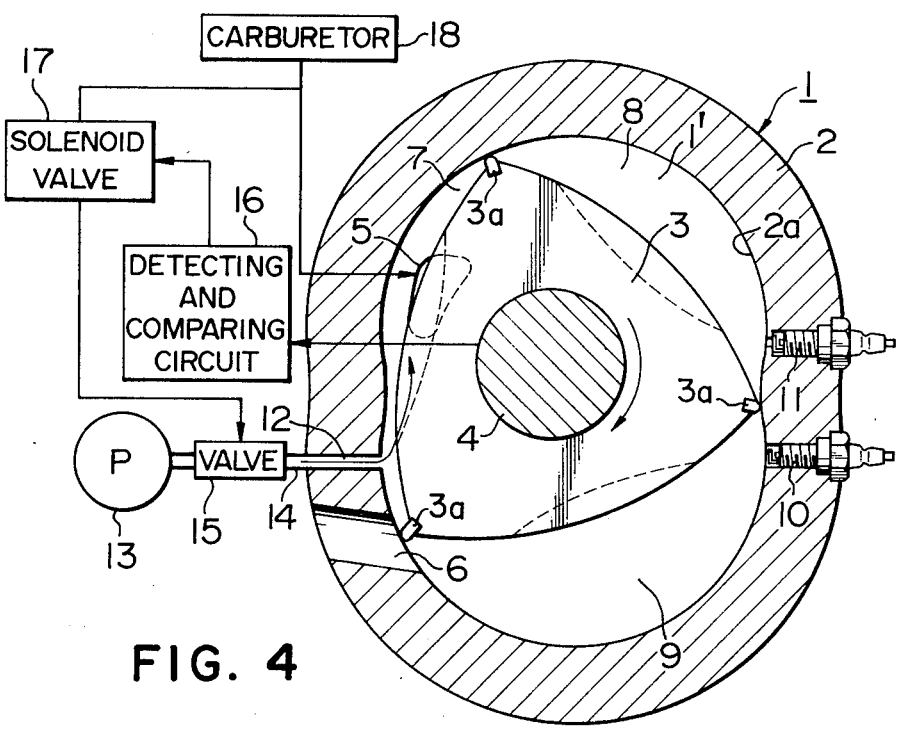
FIG. 4 is a diagrammatic sectional view of a second embodiment of the engine according to the present invention.
Figure 5:
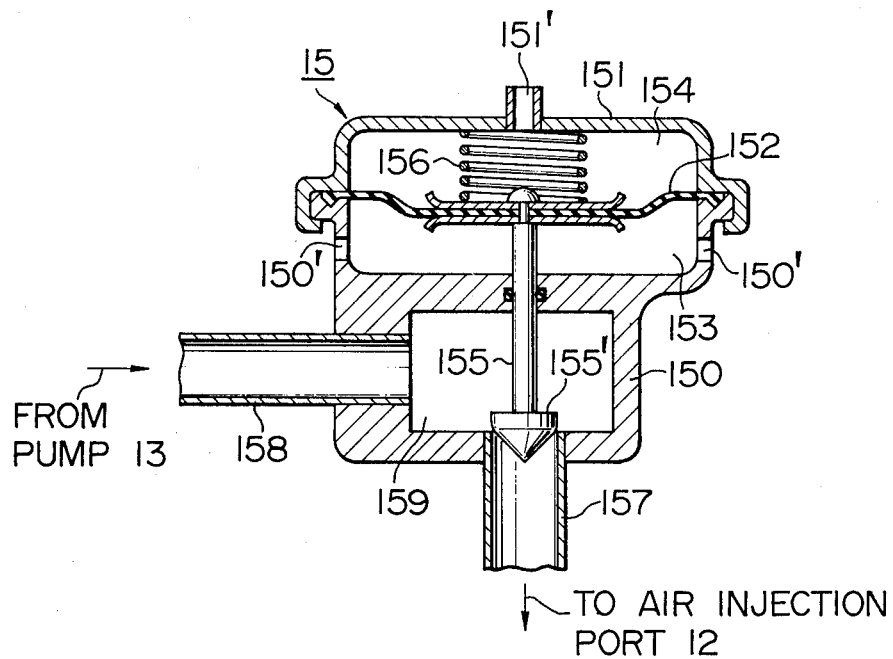
FIG. 5 is an enlarged diagrammatic sectional illustration of an example of a valve used in the engine shown in FIG. 4.
Figure 6:
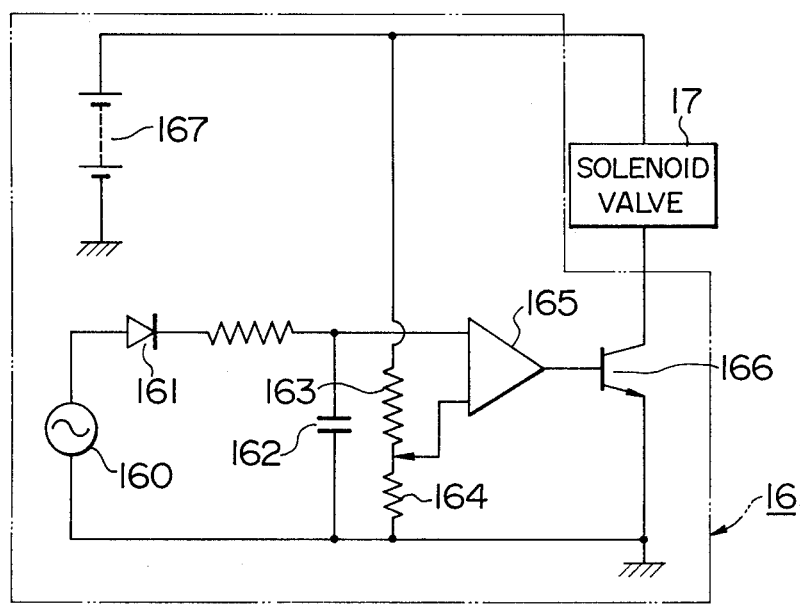
FIG. 6 is an example of an electric circuit diagram used to control the valve shown in FIG. 5.

FIGS. 4, 5 and 6 illustrate the second embodiment of the invention which is characterized by an on-off valve 15 disposed in the pipe line 14 extending between the air injection port 12 and the air pump 13 of the first embodiment described. As discussed previously, the $NO_x$ content in the exhaust gas is known as being the maximum at the air-fuel ratio of approximately 15. Thus, it is necessary to use an air-fuel mixture much leaner than air-fuel ratio of 15 in order to reduce the amounts of all of $NO_x$, CO and HC in the exhaust gas. On the other hand, if the mixture is too lean, it will become difficult to ignite the mixture. The first embodiment described above is designed to eliminate this difficulty by means of a charge which is lean as a whole but contains an amount of rich mixture distributed at a place where an ignition takes place. The first embodiment solves the problem to a substantial extent and provides appreciable advantages, but there may occur problems which the first embodiment fails to successfully deal with. An example of the problems will be encountered when the engine operates at a high speed and under a heavy load. The reasons will be firstly that a violent current is produced within a compression chamber by the high speed rotation of the rotor 3 to level or regularize the distribution of the mixture with a resultant difficulty in the ignition of a lean mixture. Thus, it is impossible to use a mixture of a greatly reduced richness in order to obtain a reliable ignition. Secondly, the carburetter produces a rich mixture when the engine operates at a high speed and under a heavy load. So as to dilute the rich mixture, a large amount of fresh air is required. However, the air pump 13 will not necessarily sufficiently comply with the requirement. For these reasons, while the supply of fresh air will reduce CO and HC contents to some extent, there may occur a case where the air supply dilutes the mixture nearly to the theoretical air-fuel ratio and it is not preferred to supply the air.

In order to solve the problem, the second embodiment of the invention employs the valve 15. This valve is controlled in accordance with the speed of the engine operation (i.e., the speed of the rotation of the rotor 3) and the load on the engine. In the preferred embodiment shown in FIG. 4, the control is achieved by control means including a detecting and comparing circuit 16 and a solenoid valve 17. The circuit 16 is operative to detect the speed of the rotation of the engine and compare the detected speed with a preset reference value. The solenoid valve 17 is disposed in a pipe line extending between the on-off valve 15 and an intake manifold downstream of a carburetter 18 (the first embodiment also includes a carburetter though not shown). The circuit 16 controls the operation of the solenoid valve 17 so that it is opened and closed.

FIG. 5 illustrates an example of the structure of the on-off valve 15. As will be seen in this figure, the valve 15 includes a housing 150 which cooperates with a cover 151 to hold a peripheral edge portion of a diaphragm 152 which defines with the housing 150 an atmospheric pressure chamber 153 and which defines with the cover 151 a vacuum chamber 154. The atmospheric pressure chamber 153 is communicated with the atmosphere by means of openings 150' formed in the housing 150, while the vacuum chamber 154 is connected to the solenoid valve 17 (shown in FIG. 4) through an opening 151' formed in the cover 151. A rod 155 is secured at one end to a central portion of the diaphragm 152 and extending downwardly therefrom. A compression spring 156 extends between the central portion of the diaphragm 152 and the cover 151 to always bias the diaphragm downwardly. The other end of the rod 155 is provided with a conical valve portion 155' which is normally urged by the spring 156 into sealing engagement with an inner end of an outlet port 157 secured to the housing 150. The housing 150 defines there in a passage 159 through which a lower part of the rod 155 extends and to which the outlet port 157 and an inlet port 158 are opened. The inlet port 158 is communicated with the air pump 13, while the outlet port 157 is communicated with the air injection port 12.

Referring to FIG. 6, the detecting and comparing circuit 16 shown in FIG. 4 preferably includes a generator 160 driven in synchronism with the rotation of the rotor 3, the output voltage generated by the generator 60 being known to vary with the variation in the rotational speed of the generator. Reference numeral 161 denotes a diode operative to rectify the output voltage of the generator 160. Reference numeral 162 represents a smoothing capacitor. Reference numerals 163 and 164 represent resistors for determining a set value. Reference numeral 165 denotes a comparator operative to compare the output voltage of the generator 160 and a set value determined by the ratio of the resistance of the resistor 163 to the resistance of the resistor 164. Reference numeral 166 represents a transistor operative to have "ON" and "OFF" states according to signals from the comparator 165. Numeral 167 represents an electric power source connected to the transistor 166 by a line in which the solenoid valve 17 is disposed. The solenoid valve 17 may be any conventional one which, when energized, is operative to open or close a passage therein.

Assuming that the speed of the engine has become larger than a set value determined by the ratio of the resistance of the resistor 163 to the resistance of the resistor 164, the transistor 166 assumes "ON" state with a result that the solenoid valve 17 is energized by the power source 167. Thus, the passage in the solenoid valve 17 is opened to allow the vacuum in the intake manifold to be fed to the on-off valve 15 (see FIG. 4). The vacuum is introduced into the vacuum chamber 154 in the valve 15. When the engine is operating under a light load, the vacuum is greater than a set value determined by the initial load given by the compression spring 156, so that the vacuum deforms the diaphragm 152 against the compression spring 156 to cause the valve portion 155' to open the inner end of the outlet port 157 with a result that a fresh air is supplied from the air pump 13 through the outlet port 157 of the valve 15 to the air injection port 12 in the housing 1. On the contrary, when the engine is operating under a heavy load, the vacuum is not so large as to move the valve portion 155' away from the inner end of the outlet port 157 against the compression spring 156. Thus, the outlet port 157 is kept closed and no air is supplied to the air injection port 12.

In the case where the rotary piston engine shown in FIG. 4 is used in an automobile, the opening and closing of the valve 15 may be controlled in accordance with the velocity of the automobile and the load on the engine. For example, the valve 15 may be closed when the velocity of the automobile becomes larger than 40 km/h. The velocity may preferably be detected by means of the rotational speed of an output shaft of a speed change gear of the automobile. When the valve is closed, the discharge pressure of the air pump will be greatly increased. This, however, will not interfere with the operation because the air pump 13 is conventionally equipped with a relief valve.

The structure and arrangement of the second embodiment of the invention advantageously eliminates the possibility that the amount of $NO_x$ is increased during an engine operation at a high speed and under a large load because of a continuous supply of air to the air injection port 12.

THIRD EMBODIMENT

Figure 7:
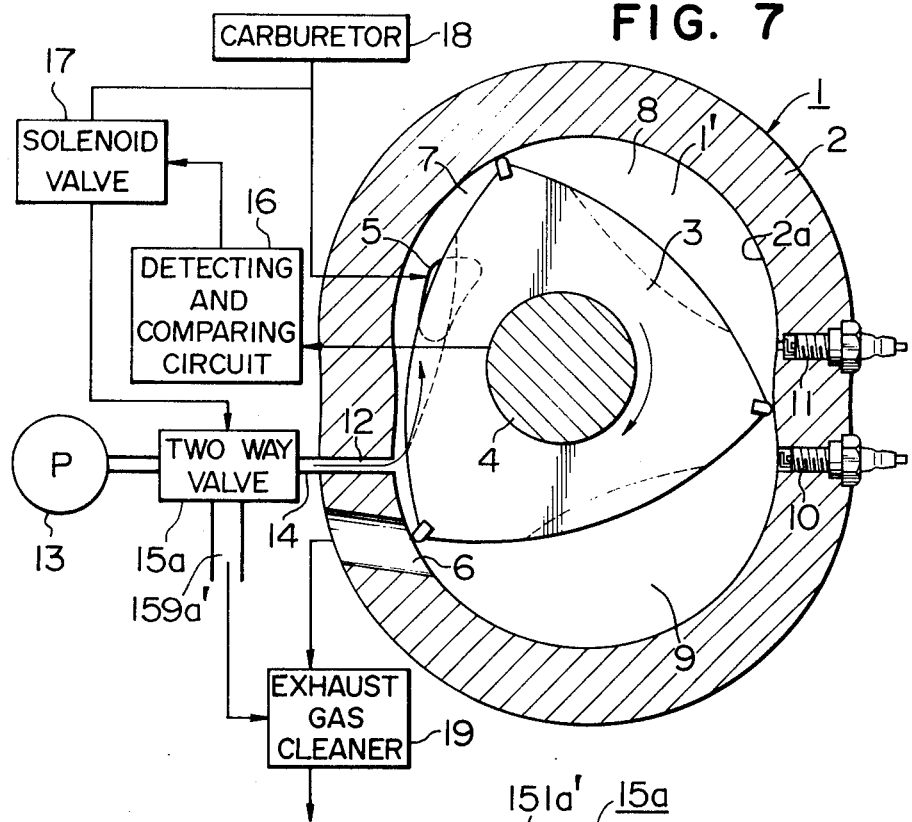
FIG. 7 is a diagrammatic sectional view of a third embodiment of the engine according to the present invention.
Figure 8:
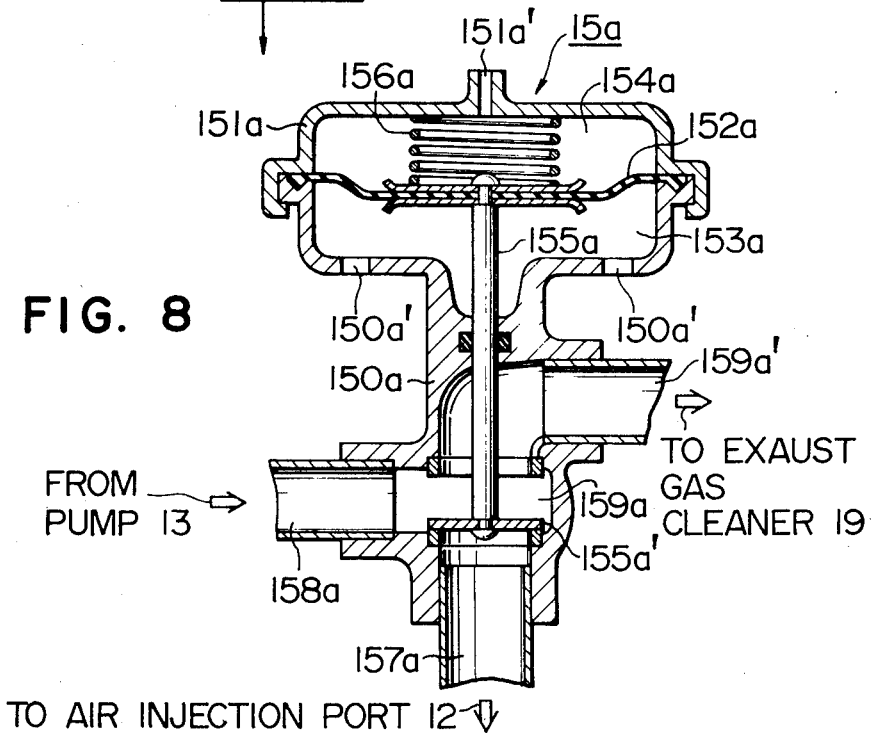
FIG. 8 is an enlarged sectional view of an example of a two way valve used in the engine shown in FIG. 7.

FIGS. 7 and 8 illustrate the third embodiment of the invention in which the on-off valve 15 of the second embodiment is replaced by a two way valve 15a. In general, it is usual that rotary piston engines are equipped with exhaust gas cleaners, such as manifold reactor, thermal reactor, catalytic reactor or the like, in the exhaust systems of the engines so as to further reduce the emissions of CO and HC. These cleaners need fresh air as secondary air. In addition, some kinds of the cleaners require additional air for cooling purpose. Even in the case where such an exhaust gas cleaner is not used, the emission of unburnt gases components can be reduced by simply supplying fresh air into the exhaust pipe.

In the second embodiment described, air is released into the atmosphere from the air pump through the relief valve thereof when the on-off valve 15 is closed. The third embodiment of the invention is so designed that air is fed into the exhaust system of the engine, such as the exhaust pipe or exhaust gas cleaner, rather than being released into the atmosphere. Incidentally, a separate air supply means may be provided for the exhaust gas cleaner and the air supply to the exhaust gas cleaner according to the present invention may be an auxiliary one.

The two way valve 15a shown in FIG. 5 may preferably have the structure and arrangement illustrated in FIG. 8. The valve 15a has diaphragm 152a, vacuum chamber 154a and atmospheric pressure chamber 153a which are essentially identical with those of the on-off valve 15 of the preceding embodiment. A rod 155a secured at one end to the diaphragm 152a has a disc valve 155a' secured to the opposite end of the rod and normally urged into sealing engagement with the inner end of a first outlet port 157a formed in a valve housing 150a. The housing is also formed therein with a second outlet port 159a' and an inlet port 158a which are communicated with each other and with the first outlet port 157a through a passage 159a also formed in the housing 150a. The inlet port 158a is communicated with the air pump 13, the first outlet port 157a being connected to the air injection port 12, and the second outlet port 159a' being connected with either an exhaust gas cleaner 19 or merely to the exhaust pipe (not shown) of the engine. The two way valve 15a is controlled by controlling means including a detecting and comparing circuit 16 and a solenoid valve 17 which may be identical with those of the preceding embodiment.

When the engine is operating under a heavy load, a small vacuum is imparted to the diaphragm 152a of the valve 15a. Thus, a compression spring 156a urges the valve 155a' against the inner end of the first outlet port 157a to close the same so that air from the air pump 13 is supplied not to the air injection port 12 but to the exhaust gas cleaner 19 or the exhaust pipe. Thus, the air from the air pump 13 is efficiently utilized even when the air is not fed to the air injection port 12.

It is to be understood that the described and illustrated structures and arrangements of the on-off valve 15, two way valve 15a, circuit 16, solenoid valve 17 etc. of the embodiments described are mere examples. In addition, the on-off valve 15 and two way valve 15a may also be used to discontinue the air supply to the air injection port 12 at a time other than during the engine operation at a high speed and under a heavy load. For example, the air supply may be stopped at such a time when the emission of $NO_x$ is increased.

FOURTH EMBODIMENT

Figure 9:
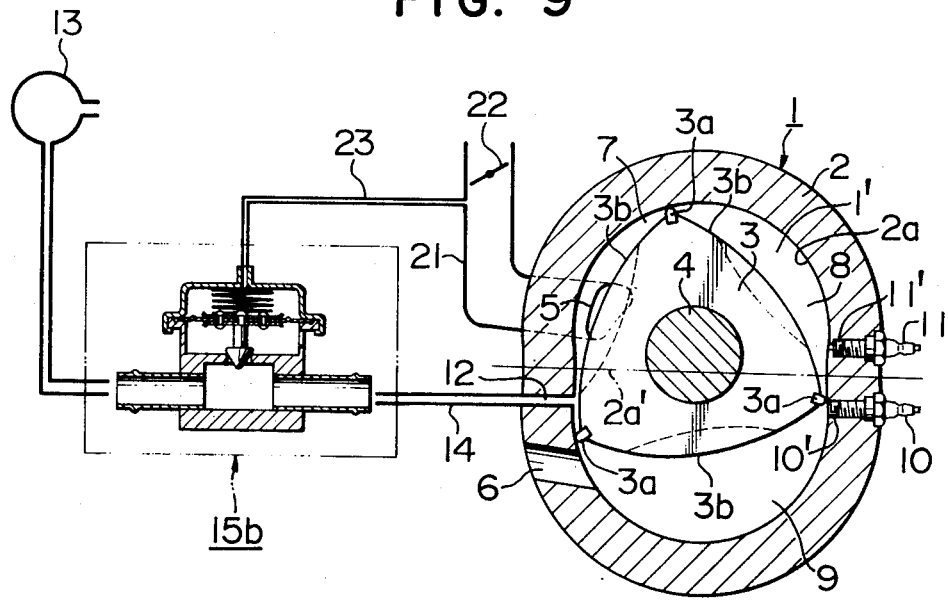
FIG. 9 is a diagrammatic sectional view of a fourth embodiment of the engine according to the present invention.
Figure 10:
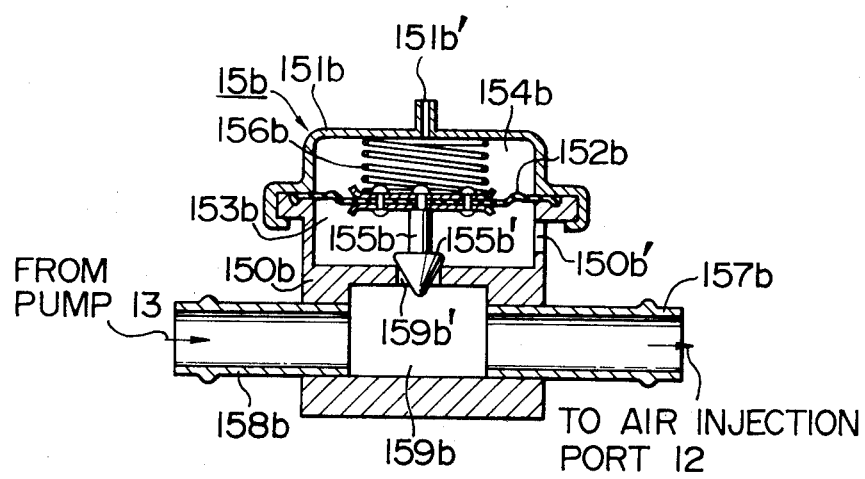
FIG. 10 is an enlarged sectional view of an example of a flow regulating valve used in the engine shown in FIG. 9.

The fourth embodiment of the invention illustrated in FIGS. 9 and 10 is characterized by a flow regulating valve 15b disposed in the pipe line 14 between the air supply means 13 and the air injection port 12. The valve 15b is connected by a pipe line 23 to an intake manifold 21 at a point downstream of a carburetter (not shown). Provided in the intake manifold 21 is a throttle valve 22 which is operatively connected to an accelerator (not shown). The flow regulating valve 15b is designed to be operative in response to variation in the intake manifold vacuum downstream of the throttle valve 22 to release into the atmosphere a part of the air from the pipe line 14.

As will be best seen in FIG. 10, the flow regulating valve 15b has atmospheric pressure chamber 153b and vacuum chamber 154b which are defined by housing 150b, cover 151b and diaphragm 152b in a manner similar to those in the valves 15 and 15a of the preceding embodiments. The housing 150b defines therein a passage 159b to which are connected inlet and outlet ports 158b and 157b which in turn are connected to the pipe line 14. Between the atmospheric chamber 153b and the passage 159b is provided an orifice 159b' through which a part of the air from the inlet port 158b can flow from the passage 159b into the atmospheric chamber 153b and thus into the atmosphere through an opening 150b' formed in the housing 150b. The air flow through the orifice 159b' can be controlled by a conical valve 155b' provided on a rod 155b mounted on and extending downwardly from the diaphragm 152b.

In operation, assuming that the engine is operated under no load condition and the vacuum within the intake manifold 21 is increased, the vacuum within the vacuum chamber 154b is increased to cause the diaphragm 152b to lift the rod 155b against the force of a compression spring 156b so that the orifice 159b' is fully opened to allow a large amount of air to be released from the passage 159b into the atmospheric chamber 153b and thus into the atmosphere. Accordingly, the amount of air to be injected into the engine through the air injection port 12 is reduced to avoid a problem that the air-fuel mixture sucked into an intake chamber 7 is made too lean.

When the engine is operated under full-load condition, the vacuum within the intake manifold 22 is decreased to allow the rod 155b to be pushed down by the compression spring 156b so that the orifice 159b' is closed by the valve 155b'. Thus, the air from the air pump 13 is all fed through the air injection port 12 into the engine to fully eliminate recirculation of exhaust gas from exhaust chamber into intake chamber.

At a part-load engine operation, the valve 155b' partly opens the orifice 159b' so that a proper amount of air is supplied to the air injection port 12.

With the fourth embodiment of the invention described, the flow regulating valve 15b is operative to supply to the air injection port 12 an amount of fresh air which is so controlled as to sufficiently prevent recirculation of exhaust gas into an intake chamber and not to cause mixture in an intake chamber to become too lean. Thus, over all the ranges of operating conditions, the engine is advantageously operable with a relatively lean air-fuel mixture and capable of reducing the emissions of CO and HC.

The second and third embodiments of the invention above-described may conveniently be applied to either a case where the air supply means are not capable of supplying a sufficient amount of air to make lean a rich air-fuel mixture supplied from the carburetter into an intake chamber at a high-speed and heavy-load engine operation or to a case where it is especially desired to prevent drop-down of engine output at a heavy-load engine operation. On the contrary, the fourth embodiment of the invention is particularly advantageously applicable to a case where the air supply means have a large capacity and it is particularly desired to reduce the emissions of harmful exhaust gases throughout all of the ranges of the operating conditions of the engine. An appropriate embodiment may be determined on the basis of consideration of the capacity of the air supply means and the degrees of the requirements for the engine output and the reduction of the harmful gas emissions.

FIFTH EMBODIMENT

Figure 11:
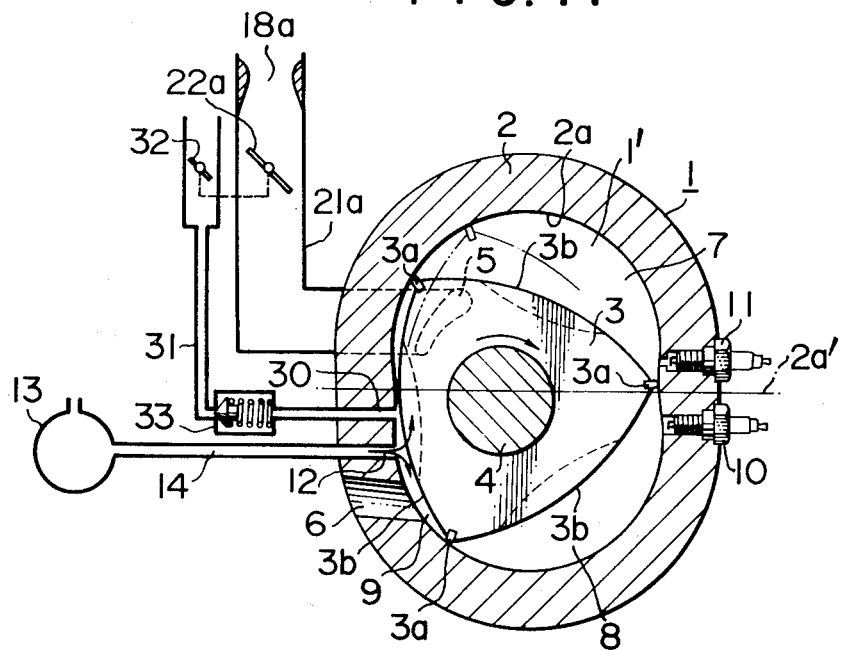
FIGS. 11 to 13 are diagrammatic views of a fifth embodiment of the engine according to the present invention showing the rotor in its different operating positions.
Figure 12:
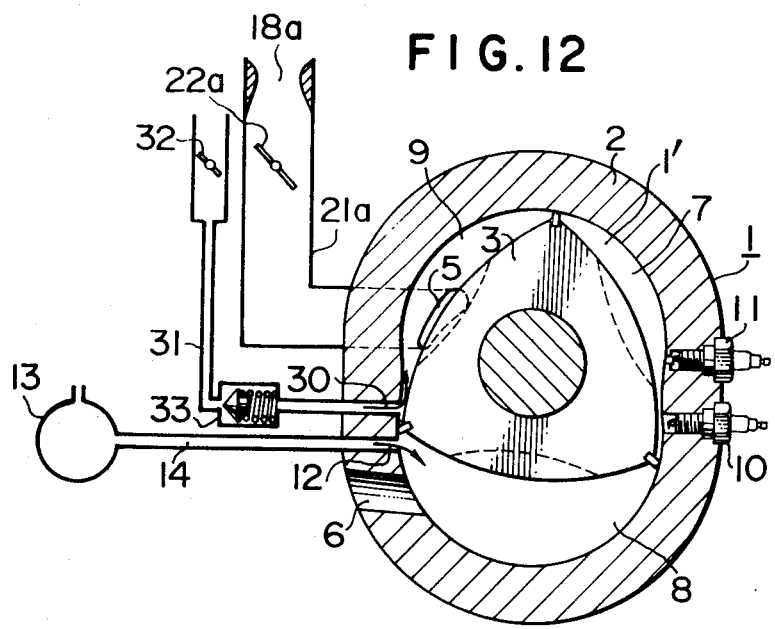
Figure 13:
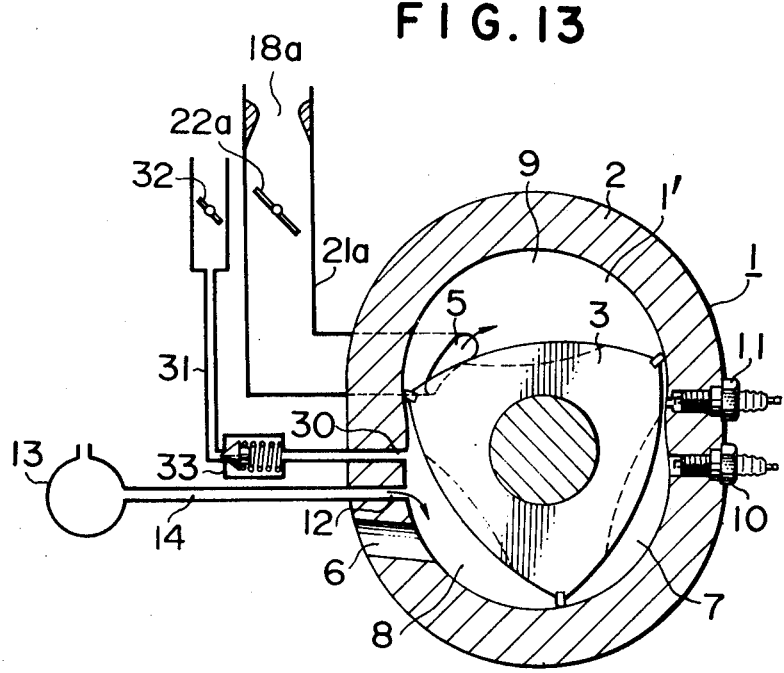

In the fifth embodiment of the invention illustrated in FIGS. 11 to 13, the intake port 5 is connected to a carburetter 18a through an intake manifold 21a. The caburetter 18a may be any conventional one for producing air-fuel mixture and is provided with a throttle valve 22a operatively connected to an accelerator (not shown).

In this embodiment, the intake and exhaust ports 5 and 6 are so positioned that one of the working chambers does not communicate with any one of the intake and exhaust ports 5 and 6 at a moment when said one working chamber is transformed from an exhaust chamber into an intake chamber; in other words, said one working chamber is brought into communication with the intake port 5 when the rotor 3 has been rotated predetermined degress after the communication between said one chamber and the exhaust port 6 was shut off.

The air injection port 12 is so positioned that the communication between the port 12 and said one working chamber is shut off before the working chamber is moved into communication with the intake port 5 and transformed into an intake chamber (in FIG. 12). In other words, the air injection port 12 is communicated with an exhaust chamber and with a working chamber when this working chamber is being transformed from the exhaust chamber into an intake chamber and the working chamber does not communicate with any one of the intake and exhaust ports 5 and 6.

In the rotor housing 2 is provided an air suction port 30 at a location forward of the air injection port 12 and rearward of the intake port 5 as viewed with respect to the rotation of the rotor 3. The air suction port 30 is so positioned as to be communicated also with a working chamber when it has been moved into communication with the intake port 5 and assumes an initial state of an intake chamber. The port 30 is connected to an air cleaner (not shown) by means of a pipe line 31 in which is mounted a valve 32 which is operatively connected to the throttle valve 22a of the carburetter 18a so as to be operative to open and close a passage in the pipe line 31. A check valve 33 is disposed in the pipe line 31 downstream of the valve 32 to allow an air flow toward the air suction port 30 but prevent an air flow in the opposite direction.

The embodiment is characterized by the procedure of the suction stroke as will be described hereunder. When the rotor 3 is in the position shown in FIG. 11, a working chamber 9 assumes the most final state of an exhaust chamber. At this time, the air injection port 12 is in communication with the working chamber 9 so that air supplied from the air pump 13 through the pipe line 14 to the air injection port 12 is introduced into the chamber 9 to force exhaust gas residual in the working or exhaust chamber 9 out through the exhaust port 6 with a resultant advantage that, after the working chamber 9 is transformed into an intake chamber, no exhaust gas is retained in the intake chamber. Thus, the intake chamber sucks and holds a fresh air-fuel mixture which is not mixed with exhaust gas (a stratum of air is also formed in the intake chamber as will be described later). Accordingly, the ignition of the mixture by means of the ignition plugs 10 and 11 is not missed even if the mixture is of a small air-fuel ratio (i.e., lean) with a result that CO and HC emissions in the exhaust gas are reduced.

When the rotor 3 is further rotated from the position shown in FIG. 11 to a position in which an apex seal 3a has been moved past the exhaust and air injection ports 6 and 12 as shown in FIG. 12, the working chamber 9 is communicated with the intake port 5 and now rendered an intake chamber. The air supplied to the air injection port 12 can no longer be introduced into the working chamber 9 but flows into a succeeding working chamber 8 which has now been rendered an exhaust chamber. Therefore, there occurs no possibility that the air forced through the air injection port 12 flows out of the engine through the intake port 5 and the carburetter 18a to emit an unburnt mixture into the atmosphere. The air injected into the working chamber 8 facilitates recombustion of CO and HC components of the exhaust gas and reduces the emissions thereof.

Since the air suction port 30 is communicated with the working chamber 9 after it has been transformed into the intake chamber, air is sucked by the rotation of the rotor 3 into the intake chamber 9 through the valve 32, check valve 33, pipe line 31 and air suction port 30. When the rotor 3 is further rotated to a position in which an apex seal 3a has passed past the air suction port 30, as shown in FIG. 13, the port 30 is no longer communicated with the intake chamber 9 but is now opened to the exhaust chamber 8 and subjected to the pressure of the exhaust gas. However, the check valve 33 operates to prevent the exhaust gas from being released through the pipe line 31 into the atmosphere. Into the intake chamber 9 which is now not in communication with the air suction port 30 is sucked an air-fuel mixture produced by the carburetter 18a and fed through the intake port 5 in accordance with the rotation of the rotor 3.

The carburetter 18a will be so adjusted as to produce an air-fuel mixture of a richness equal to or richer than conventional air-fuel ratio of 13. When the rotor 3 is positioned between the positions shown in FIGS. 12 and 13, the air-fuel mixture and fresh air are sucked into the working chamber 9 through the intake and suction ports 12 and 30. However, the throttle valve 22a of the carburetter 18a is operatively connected to the valve 32 in the pipe line 31 so that the ratio of the fuel from the intake port 5 to the total amount of air from both intake and air suction port 5 and 30 is kept at a proper constant value and there is no possibility that air is so excessively sucked-in as to make the mixture too lean.

By the characterized procedure of the intake stroke of the engine, air and mixture are distributed in the working chamber 9 in a stratified fashion, i.e., a stratum of air or a very lean mixture is held at the forward or leading end of the chamber 9 (as viewed with respect to the rotation of the rotor 3) while a stratum of a rich mixture is retained at the remaining part of the chamber 9, the mean richness of the whole air-fuel mixture throughout the chamber 9 being lean. When the rotor 3 is further rotated from the position shown in FIG. 13, the mixture in the working chamber 9 is compressed and ignited by means of the ignition plugs 10 and 11. In this concern, it is particularly pointed out that the said rich mixture, which is readily ignitable, can be so distributed within the working chamber 9 as to be placed adjacent to the ignition plugs for reliable ignition thereby. Thus, a mixture charge within a working chamber, which is very lean as a whole, can be substantially completely burnt to minimize emissions of CO and HC.

SIXTH EMBODIMENT

Figure 14:
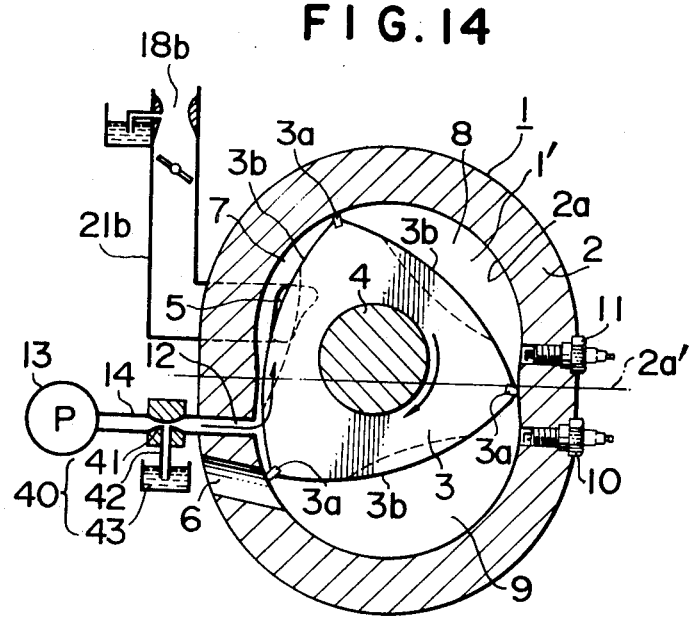
FIGS. 14 and 15 are diagrammatic views of a sixth embodiment of the engine according to the present invention showing the rotor in its different operating positions.
Figure 15:
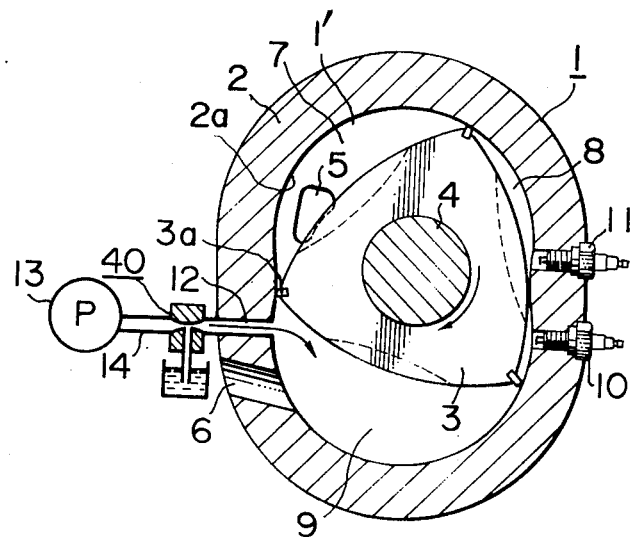

The sixth embodiment illustrated in FIGS. 14 and 15 is characterized by fuel supply means 40 provided in the pipe line 14 between the air supply means 13 and the air injection port 12. The fuel supply means 40 include a venturi 41 formed in the pipe line 14 to increase the velocity of the air when passed therethrough. A fuel passage 42 is opened at one end to the venturi 41 and extends at the other end into a fuel reservoir 43 which contains or holds an amount of fuel so that the fuel is jetted into the venturi by the vacuum acting on the end of the fuel passage 42 opened to the venturi 41. By the operation of the fuel supply means 40 is produced an air-fuel mixture in the pipe line 14 at a point downstream of the fuel supply means 40. The amounts of air and fuel to be fed are so adjusted that the resultant air-fuel mixture is relatively rich and may, for example, be of an air-fuel ratio of approximately 13. On the other hand, a carburetter 18b associated with the engine is so adjusted as to produce an air-fuel mixture which is much leaner than an air-fuel mixture for conventional rotary piston engine. In a certain operating condition, a carburetter may be employed which is so constructed and arranged as to supply air only.

In operation, a fresh air supplied from the air supply means 13 and a fuel supplied by the fuel supply means 40 into the air are mixed to form a fresh air-fuel mixture which is continuously supplied to working chambers. Namely, when the rotor 3 is in the position shown in FIG. 14, in which one of the apex seals 3a on the rotor 3 is placed between the exhaust and air injection ports 6 and 12, the working chambers 7, 8 and 9 assume intake, compression and exhaust chambers, respectively, the chambers 7 and 9 being in the initial states of the intake and exhaust chambers, respectively. At this moment, the air injection port 12 is opened to the working chamber 7 (which is in the initial state of the intake chamber) to which the fresh mixture is supplied though the air injection port 12. When the rotor 3 is rotated from the position shown in FIG. 14 to a position shown in FIG. 15, one of the apex seals 3a is moved past the air injection port 12. As soon as the said one apex seal 3a is moved past the air injection port 12, i.e., before the rotor is rotated to the FIG. 15 position, the supply of mixture to the intake chamber 7 is stopped and, thereafter, the mixture is fed into the exhaust chamber 9, as shown in FIG. 15.

As such, the mixture supplied through the air injection port 12 into successive working chambers advantageously functions as follows: Firstly, when the exhaust gas in an exhaust chamber 9 tends to recirculate into a preceding intake chamber 7, the mixture fed through the port 12 forms a sheet of blanket to prevent the recirculation so that the intake chamber 7 can retain only fresh mixtures injected through the injection port 12 and sucked through the intake port 5 but does not receive any part of the exhaust gas from the exhaust chamber, with a result that a reliable operation can be assured even if lean mixtures are used. Secondly, the mixture injected into an exhaust chamber 9 is chemically combined with unburnt combustible components contained in the exhaust gas to burn away these components for thereby reducing the emissions of harmful components, particularly, HC.

In addition, the supply of air-fuel mixture from the injection port 12 into the intake chamber 7 is carried out only during the period from the time one of the apex seals 3a on the rotor has passed past the exhaust port 6 and to the time the one apex seal just reaches the injection port 12, i.e., only while the intake chamber 7 is in its initial state. Thereafter, another air-fuel mixture is sucked through the intake port 5 into the intake chamber 7. Thus, the mixture supplied through the injection port 12 is distributed at the forward or leading end portion (as viewed with respect to the rotation of the rotor 3) of the intake chamber 7 when it is in its position shown in FIG. 15, whereas the mixture sucked through the intake port 5 is distributed at the rearward or trailing end portion of the intake chamber 7. This stratified distribution of the mixture is substantially maintained by the time when the rotor 3 is further rotated from the FIG. 15 position, the working chamber 7 is transformed into a compression chamber and an ignition by the ignition plugs 10 and 11 takes place. In general, the ignition of a mixture by means of an ignition plug or plugs takes place before a rotor reaches to the top dead center of a compression stroke. Thus, by positioning at the forward end of the working chamber (combustion chamber) the mixture supplied from the injection port 12 and by arranging such that the mixture is relatively rich, for example, of air-fuel ratio of about 13, as discussed above, it can be assured that the ignition of a mixture charge by means of ignition plugs 10 and 11 is reliably carried out and any misfire is surely avoided. It is known that even a substantially lean mixture can be surely burnt once the mixture is ignited. With the structure and arrangement described, by setting the mixture from the injection port 12 at a proper air-fuel ratio, a reliable engine operation can be assured even if the mixture introduced through the intake port 5 is substantially lean; in an extreme case, air only may be supplied through the intake port 5.

With the arrangement described, the air-fuel mixture fed through the injection port 12 is produced in the pipe line 14 by means of the venturi 41 which is operative to supply fuel through the fuel passage 42 into the air flowing through the venturi at an increased velocity. The fuel can be surely and efficiently atomized by the air stream and uniformly mixed with the air to form a mixture. The uniform mixture advantageously avoids a possibility that drops of fuel are formed at a localized area of a working chamber, such as the rearward end thereof. Also in this point of view, the arrangement described assures a reliable engine operation by means of a lean mixture.

SEVENTH EMBODIMENT

With the preceding embodiment, an air-fuel mixture is also fed into an exhaust chamber to burn away the unburnt combustible components of the exhaust gas. However, an air-fuel mixture is not necessarily required for this purpose. In fact, simple air supply to the exhaust chamber can surely cause a re-combustion of the exhaust gas due to the heat thereof. Considering the fact that a part of the mixture supplied through the injection port 12 into an exhaust chamber is directly discharged through the exhaust port 6, it is rather preferred that air only is supplied through the injection port 12 into an exhaust chamber. While tests have shown that the amount of air-fuel mixture exhausted through the exhaust port 6 is very small and thus no serious problem will be caused by continuous supply of air-fuel mixture through the injection port 12, it will be recommendable to supply mixture through the injection port 12 only when the port is in communication with an intake chamber 7 and to feed air only through the port 12 at the other time, i.e., when the injection port is opened to an exhaust chamber in order to achieve further improvements in the purification of exhaust gas and in fuel consumption.

Figure 16:
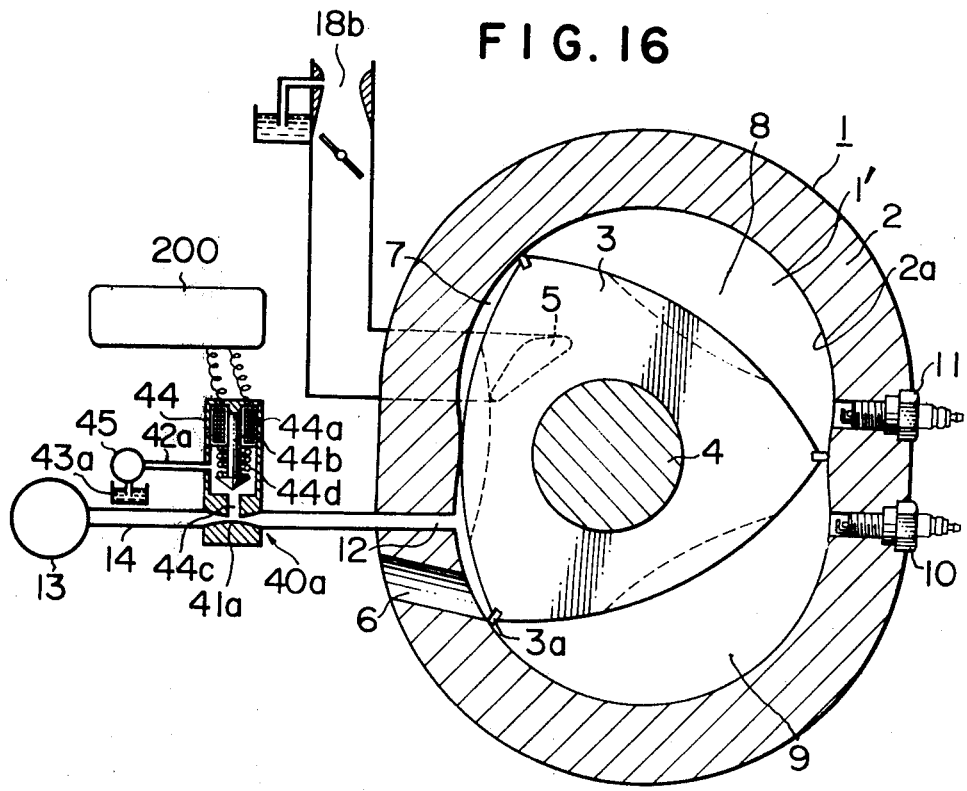
FIG. 16 is a diagrammatic sectional view of a seventh embodiment of the engine according to the present invention.
Figure 17:
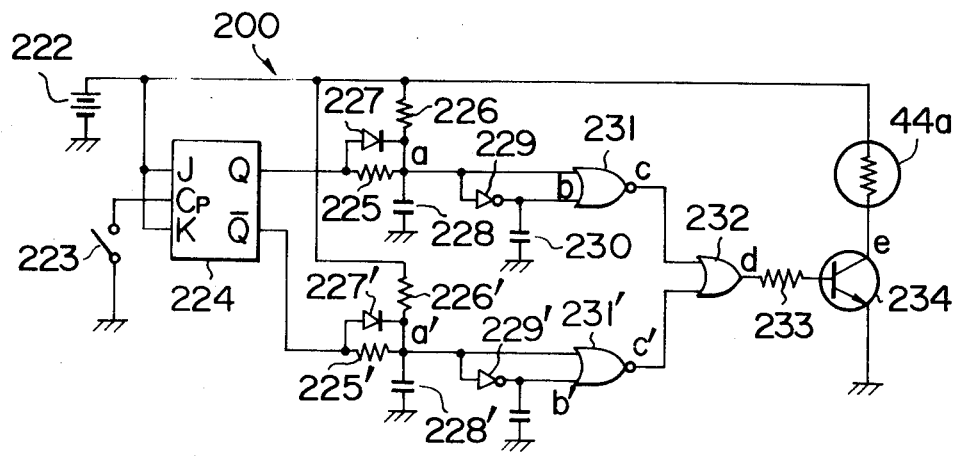
FIG. 17 is an example of an electric circuit diagram used to control a fuel injection valve shown in FIG. 16.
Figure 18:
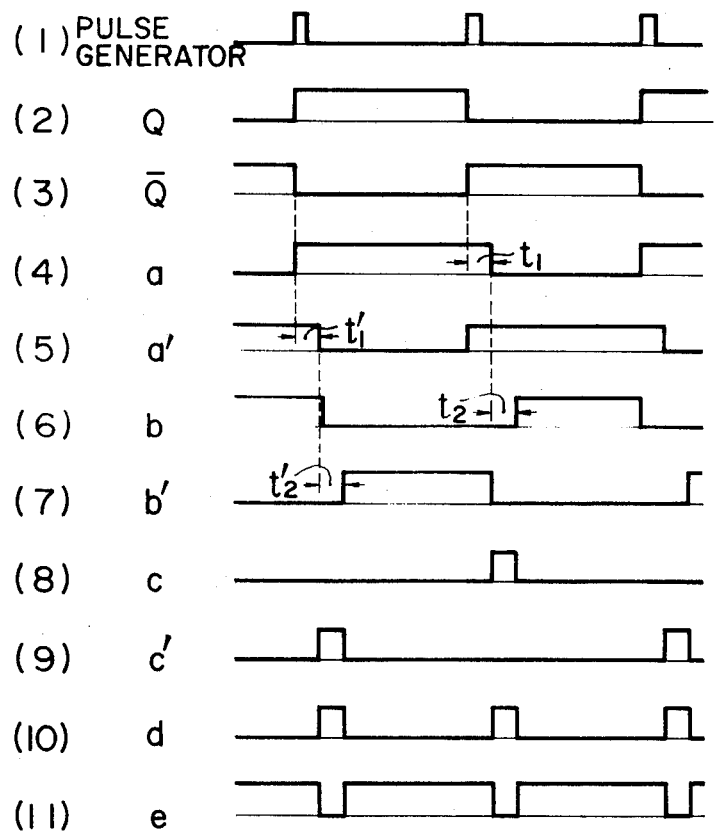
FIG. 18 illustrates electric voltage wave forms at respective points of the circuit shown in FIG. 17.

This is achieved by the seventh embodiment of the invention shown in FIGS. 16 to 18. The embodiment is characterized by fuel supply means 40a which inject fuel into the air flowing through the pipe line 14. The fuel supply means 40a include a venturi 41a disposed in the pipe line 14, a fuel injection valve 44 in the form of a solenoid valve operative to inject fuel into the venturi, controlling means 200 for controlling the opening and closing operation of the fuel injection valve 44 and thus the injection of fuel by the valve 44, a fuel reservoir 43a, a pipe line 42a between the fuel reservoir 43a and the valve 44, and a fuel pump 45 disposed in the pipe line 42a to supply fuel under pressure to the valve 44. The latter includes a coil 44a adapted to be energized and deenergized by the controlling means 200, a needle 44b axially movable according to the energization and deenergization of the coil 44a, an injection orifice 44c adapted to be closed and opened by the needle 44b and a compression spring 44d biasing the needle 44b toward the orifice 44c, the latter being open to the venturi 41a.

The controlling means 200 are operative to emit pulsated signals according to the rotation of the rotor 3 to energize and deenergize the coil 44a of the fuel injection valve 44 for controlling the injection of fuel so that the coil 44a is energized to lift the needle 44b to open the injection orifice 44c for the injection of fuel into the venturi 41a only when the injection port 12 is open to an intake chamber 7. The coil 44a of the fuel injection valve 44 is deenergized to discontinue the injection of fuel when the injection port 12 is communicated with an exhaust chamber 9.

FIG. 17 illustrates an example of a principal electric circuit of the controlling means 200 for performing the operation discussed above, while FIG. 18 diagrammatically illustrates wave forms of electric voltage at various points of the circuit shown in FIG. 17. Incidentally, with the circuit arrangement shown in FIG. 17, the period from the time the rotor reaches its top dead center and to the time the coil 44a of the fuel injection valve 44 is energized and the period of time while the coil is kept energized are invariable. Thus, in a case where the speed of the rotation of the rotor 3 is variable, no control can be performed in such a manner that the injection of air-fuel mixture through the injection port 12 is started at the same time the injection port 12 is brought into communication with an intake chamber 7 and that the fuel supply through port 12 to the intake chamber 7 is stopped and injection of air through the port 12 is started when the port is communicated with a succeeding exhaust chamber. However, in the view points of the improvement in the fuel consumption and the elimination of direct discharge of air-fuel mixture through the exhaust port 6, it will be satisfactory that the injection of air-fuel mixture through the injection port 12 is stopped at least when the port 12 is communicated with an exhaust chamber 9. In addition, in the case where the mixture injected through the injection port 12 is to be fed to an intake chamber 7 so as to be distributed at the forward end portion of the chamber, it does not give rise to any serious problem that the injection port 12 does not continuously supply air-fuel mixture to the intake chamber 7 throughout the time while the port 12 is communicated with the chamber 7 and air is also supplied to the intake chamber 7 during a part of the time. Accordingly, the structure of the circuit shown in FIG. 17 sufficiently achieves the purpose of the invention, while it is a matter of course that the most preferred is a circuit which is capable of varying, according to the speed of the rotor 3, the time when the injection of fuel by the fuel injection valve 44 starts and the duration of the fuel injection.

In FIG. 17, reference numeral 222 denotes an electric power source, numeral 223 denoting a pulse generator, numeral 224 denoting a JK flip-flop circuit, numerals 225, 226, 225' and 226' indicating resistors, numeral 227 and 227' indicating diodes, numerals 228 and 228' indicating capacitors, numerals 229 and 229' indicating "NOT" circuits, numerals 230 and 230' indicating capacitors, numerals 231 and 231' indicating "NOR" circuits, numeral 232 indicating "OR" circuit, numeral 233 indicating a resistor, and numeral 234 indicating a transistor which is connected to the power source 222 in series with the coil 44a of the fuel injection valve 44. The pulse generator 223 is designed to generate pulses according to the rotation of the rotor 3 so that a pulse is emitted when the rotor comes to the top dead center of an exhaust stroke. The generator may comprise, for example, a lead switch which is operable to be opened and closed by a magnet (not shown) rigidly mounted on the output shaft of the rotor 3 or a rotary shaft of a distributor (not shown) for the ignition plugs 10 and 11, the lead switch being disposed in opposite relationship to the magnet.

The wave form of a voltage pulse generated by the pulse generator 223 is diagrammatically illustrated in FIG. 18 (1). The JK flip-flop circuit 224 receives the voltage pulse (1) as an input and emits at its output terminals Q and $\overline{Q}$ outputs of voltage wave forms illustrated in FIG. 18 (2) and (3). The wave form (2) at the output terminal Q is deformed at a point $a$ to a wave form illustrated in FIG. 18 (4) which descends down from "1" to "0" with a time lag $t_1$, while the wave form (3) at the output terminal $\overline{Q}$ is deformed at a point $a'$ into a wave form illustrated in FIG. 18 (5) which also descends from "1" to "0" with a time lag $t'_1$. The time lag $t_1$ depends upon the resistances of the resistors 225 and 226 and the capacity of the capacitor 228, whereas the time lag $t'_1$ depends on the resistances of the resistors 225' and 226' and the capacity of the capacitor 228'. The wave form (4) at the point $a$ is directly received by the "NOR" circuit 231 as one of the inuts thereof and is also divided into the "NOT" circuit 229. At a point $b$ after the "NOT" circuit 229, the voltage wave is deformed into a form illustrated in FIG. 18 (6), which is the other input of the "NOR" circuit 231. As will be seen in FIG. 18 (4) and (6), the wave form at the point $b$ is inverted from the wave form at the point $a$ with a time lag $t_2$ which depends upon the internal resistance of the "NOT" circuit 229 and the capacity of the capacitor 230. The "NOR" circuit 231, which has received as its inputs the wave forms (4) and (6), emits at a point $c$ an output having a wave form illustrated in FIG. 18 (8). Similarly, the wave form at the point $a'$ is deformed at points $b'$ and $c'$ into wave forms as illustrated in FIG. 18 (7) and (9). The time lag $t'_2$ at the point $b'$ depends upon the internal resistance of the "NOT" circuit 229' and the capacity of the capacitor 230'. The wave forms (8) and (9) at the points $c$ and $c'$ are the inputs of the "OR" circuit 232 which emits at point $d$ an output having a wave form illustrated in FIG. 18 (10), which causes the transistor to perform an "ON-OFF" operation. Thus, the voltage at point $e$ has a wave form illustrated in FIG. 18 (11). When the transistor 234 is in its "ON" state, the coil 44a is energized by the power source 222, whereas the coil is deenergized when the transistor 234 is in its "OFF" state.

By equalizing the time lags $t_1$ and $t'_1$ shown in FIG. 18 (4) and (5) and also making equal the time lags $t_2$ and $t'_2$ shown in FIG. 18 (6) and (7), it is possible not only to start the supply of electric current to the coil 44a with a delay $t_1$ from each time when the rotor 3 (FIG. 16) comes to the top dead center of the exhaust stroke and but also to continue the electric current supply for the time $t_1$ during which the fuel is fed from the fuel injection valve 44 to the venturi 41a (FIG. 16). By setting such that the time $t_1$ is equal to a period from the time the rotor 3 comes to the top dead center of the exhaust stroke to the time the exhaust chamber involved is transformed into an intake chamber (i.e., one apex seal 3a on the rotor is moved past the exhaust port 6) in the operation of the engine at the practically highest speed of the rotor 3 and that the time $t_2$ is equal to a period from the time the one apex seal 3a has been moved past the exhaust port 6 to the time the communication between the intake chamber and the injection port 12 is shut off (i.e., the one apex seal 3a is moved past the injection port 12), it is possible at least to prevent injection of fuel into exhaust chambers throughout all of the ranges of the operating speed of the rotor 3 (of course, a consideration must be made on the delay from the time the fuel is injected into the venturi 41a to the time the fuel is formed into an air-fuel mixture and injected through the injection port 12).

With the seventh embodiment, therefore, it is possible to prevent unburnt mixture from being exhausted through the exhaust port 6 and also to save the fuel.

All of the embodiments of the invention described achieve stratified combustion of rich and lean mixtures. One group of the embodiments (first to fifth) is designed to locate the lean mixture at the forward end portion of a combustion chamber, while the other group of embodiments (sixth and seventh) is designed to locate the rich mixture at the forward end portion of a combustion chamber. With the one group of embodiments, engine output is improved because an ignition takes place on a rich mixture located at the rearward end portion of a combustion chamber and the rotation of the rotor 3 causes a flow of gas toward forward end of the combustion chamber with a result that all the air located at the forward end portion of the combustion chamber can be efficiently utilized for the combustion of fuel. However, it is impossible to completely eliminate HC emission because the part of fuel located adjacent to the rearward end of the combustion chamber tends to be unburnt. On the other hand, the other group of embodiments surely reduces the HC emission because the rich mixture located adjacent to the forward end of the combustion chamber can be easily ignited and burnt. However, the engine according to the other group of embodiments cannot provide an output comparable to that by the one group of embodiments because the ignition takes place on the rich mixture at the forward end portion of the combustion chamber and the air at the rearward end portion of the chamber cannot be all efficiently utilized for the combustion.

One of the groups of the embodiments may be chosen on the basis of consideration of various requirements for the engine.

What is claimed is:

1. A rotary piston engine comprising a housing having a trochoidal peripheral wall and side walls disposed on both sides of said peripheral wall, a rotor adapted to perform a planetary rotary motion along said peripheral wall, and intake and exhaust ports formed in said housing, said rotor having peripheral sides which define with said peripheral wall a plurality of working chambers, said planetary rotary motion of said rotor causing each of said working chambers sequentially to act as intake, compression, combustion and exhaust chambers for a working fluid, wherein an air injection port is formed in said housing between said exhaust port and the portion of said peripheral wall through which the minor axis of the trochoidal curve extends, said air injection port being so positioned in said housing as to be in communication with an intake chamber when the same is in its initial state, means for supplying air through said air injection port into said engine, fuel supply means in a passage extending between said air injection port and said air supplying means for supplying fuel to said air injection port, and means for controlling said fuel supply means so that fuel is fed by said fuel supply means only when said air injection port is communicated with an intake chamber.

2. A rotary piston engine according to claim 1, wherein said fuel supply means include a venturi formed in said passage extending between said air injection port and said air supply means.

3. A rotary piston engine comprising a housing having a trochoidal peripheral wall and side walls disposed on both sides of said peripheral wall, a rotor adapted to perform a planetary rotary motion along said peripheral wall, and intake and exhaust ports formed in said housing, said rotor having peripheral sides which define with said peripheral wall a plurality of working chambers, said planetary rotary motion of said rotor causing each of said working chambers sequentially to act as intake, compression, combustion and exhaust chambers for a working fluid, wherein an injection port is formed in said housing between said exhaust port and the portion of said peripheral wall through which the minor axis of the trochoidal curve extends, said injection port being so positioned in said housing as to be in communication with an intake chamber when the same is in its initial state, means for supplying a rich air-fuel mixture through said injection port into said intake chamber, and means for supplying a lean air-fuel mixture or air through said intake port into the intake chamber.

4. A rotary piston engine according to claim 3, wherein said rich air-fuel mixture supplying means comprises a means for supplying air into said injection port, a passage communicating said air supplying means with said injection port and a means for supplying fuel into said passage.

5. A rotary piston engine comprising a housing having a trochoidal peripheral wall and side walls disposed on both sides of said peripheral wall, a rotor adapted to perform a planetary rotary motion along said peripheral wall, and intake and exhaust ports formed in said housing, said rotor having peripheral sides which define with said peripheral wall a plurality of working chambers, said planetary rotary motion of said rotor causing each of said working chambers sequentially to act as intake, compression, combustion and exhaust chambers for a working fluid, wherein an injection port is formed in said housing between said exhaust port and the portion of said peripheral wall through which the minor axis of the trochoidal curve extends, said injection port being so positioned in said housing as to be in communication with an intake chamber when the same is in its initial state, and a means is provided for supplying air-fuel mixture through said injection port into said intake chamber, said air-fuel mixture supplying means comprising a means for supplying air into said injection port, a passage communicating said air supplying means with said injection port, means for supplying fuel into said passage, and means for controlling the fuel supply to said passage so that fuel is fed into said passage only when said injection port is communicated with said intake chamber.

6. A rotary piston engine according to claim 5, wherein said fuel supplying means comprises an electromagnetic valve means operative to inject fuel into said passage, a means for controlling the operation of said valve means so that fuel is injected by said valve means intermittently in synchronism with the rotation of said rotor, and means for feeding fuel to said valve.

7. A rotary piston engine according to claim 6, wherein said fuel supplying means includes a venturi formed in said passage, said electromagnetic valve means being so disposed as to inject the fuel into said venturi.

* * * * *